J. G. RIEFF.
DETACHABLE CHAIN HOOK.
APPLICATION FILED APR. 9, 1921.
1,388,305. Patented Aug. 23, 1921.
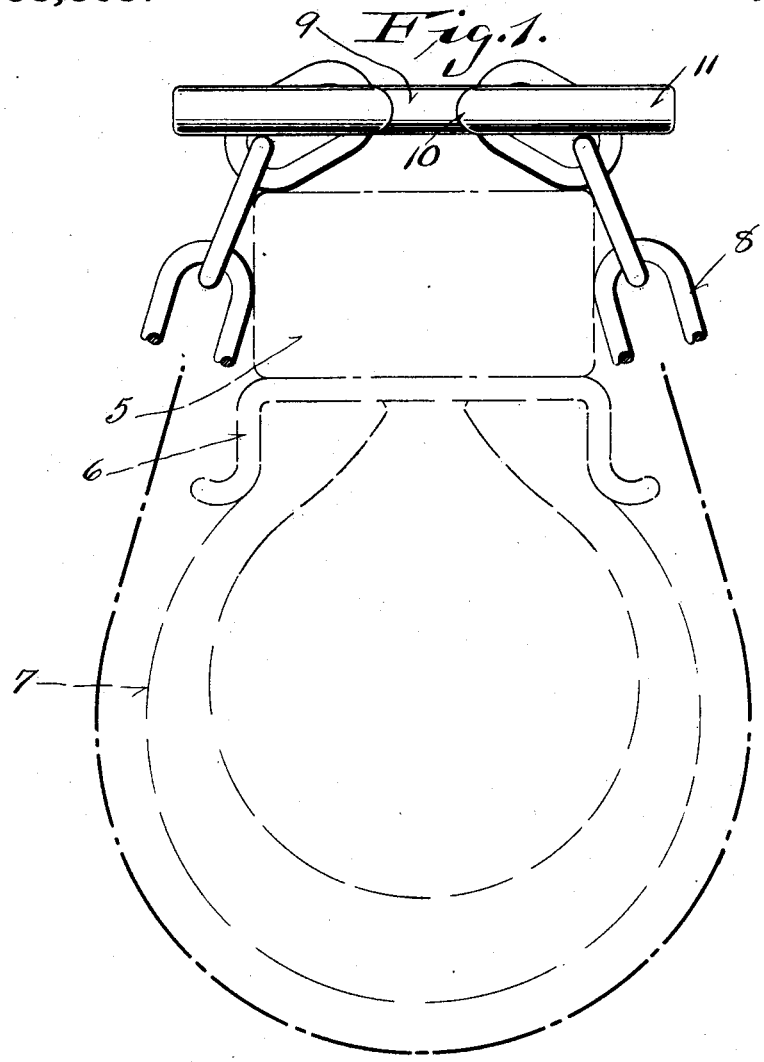
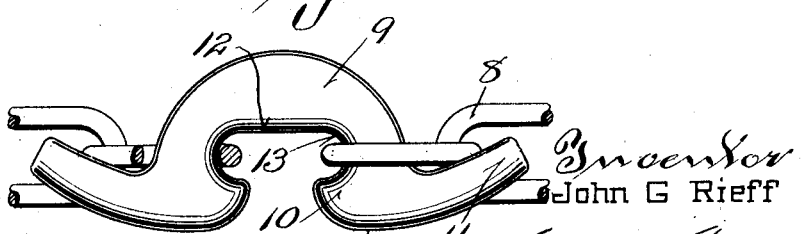
Inventor
John G Rieff
By Young and Young
Attorneys

UNITED STATES PATENT OFFICE.

JOHN G. RIEFF, OF LONDON, WISCONSIN.

DETACHABLE CHAIN-HOOK.

1,388,305.  Specification of Letters Patent.  Patented Aug. 23, 1921.

Application filed April 9, 1921. Serial No. 459,907.

*To all whom it may concern:*

Be it known that I, JOHN G. RIEFF, a citizen of the United States, and resident of London, in the county of Dane and State of Wisconsin, have invented certain new and useful Improvements in Detachable Chain-Hooks; and I do hereby declare that the following is a full, clear, and exact description thereof.

My invention relates to a detachable chain hook having two hook portions which are adapted to engage the ends of the chain to secure the same together, and it is more especially adapted for use in connection with an anti-skid chain for automobile or truck tires.

One important object of my invention is to provide a means by which anti-skid chains in separate lengths may be readily and quickly secured around the tire.

Another important object of my invention is to provide such a device which may be attached to the wheel without using a jack.

A still further object of the invention is to provide a device of this kind, which may be attached after the vehicle has become mired.

It is also an object of the invention to construct a device in such a manner that it can never become detached accidentally but may be very readily detached when desired.

With the above objects in view, my invention resides in certain details of construction which are illustrated in the accompanying drawings, in which:

Figure 1 is a side elevation of the device as it may be applied to the tire of a vehicle, and Fig. 2 is a plan view of the hook with the front portions of a chain attached thereto.

Referring more specifically to the drawings, the numeral 5 designates the felly of a pneumatic tired vehicle, 6 designates the rim and 7 the outer tire casing. The section of chain 8 is passed around the tire and felly and the ends of the chain are secured over the hook portions of my device as shown in Fig. 2.

These hook portions are connected by a web 9 which may be substantially circular in shape. The hook portions 10 are formed integral with the web portion 9 and extend toward each other. Wings 11 extend in opposite directions from the hook portions. The inner side of the web portion 9 is substantially straight as shown at 12, and the inner sides of the hook portions are semi-circular as shown at 13. The outer side of the wing 11 and the hook portion 10 which is substantially a continuation thereof in the opposite direction, is convex, as shown at 14.

When it is desired to attach the chain it is passed around the tire and the end links are passed over the respective wings 11, and over the hook portions 10. The convex outer surface 14 facilitates the passage of the link over the wing and hook and the distance across the widest portion of the hook 10 is slightly less than the free space within the end link.

After the link is passed over the point of the hook, it is received within the semi-circular portion 13. After the ends of the chain have been attached to the hook it will be seen that the weight thereof will retain the link within the semi-circular portion 12, and it cannot be shaken loose. The chain may become misplaced so that the hook will hang over the side of the felly but the weight of the chain, no matter in what position it is held, will effectually prevent accidental detachment.

From the foregoing description it will be seen that my invention can be very quickly attached regardless of the position of the vehicle and as many of these chains may be used as is found necessary. There is no chance of a portion of the chain becoming detached and knocking against the fender as is so often the case, with the usual anti-skid chains that are used.

I claim as my invention:

1. A chain hook comprising two oppositely disposed hook portions connected by a web, and extending toward each other, the inner edge of each hook portion being substantially semi-circular, and a wing formed integral with each hook portion and extending outwardly therefrom and having its outer face convexly curved so as to facilitate the passing of the chain link thereover.

2. A chain hook comprising two oppositely disposed hook portions connected by a web, and extending toward each other, the inner edge of each hook portion being substantially semi-circular, and a wing formed integral with each hook portion and extending outwardly therefrom and having its outer face convexly curved so as to facilitate the passing of the chain link thereover, the point of the hook being substantially a continuation of the wing portion in the opposite direction so that the weight of the chain will effectually prevent the said link from becoming accidentally detached.

3. A chain hook comprising two oppositely disposed hook portions connected by a web and extending toward each other, the inner edge of each hook portion being substantially semi-circular, and a wing formed integral with each hook portion and extending outwardly therefrom and having its outer face convexly curved so as to facilitate the passing of the chain link thereover, the distance between the inner side of the wing portion and the point of the hook being slightly less than the free space in the link which is to be passed thereover, the point of the hook being substantially a continuation of the wing portion in the opposite direction so that the weight of the chain will effectually prevent said link from becoming accidentally detached.

In testimony that I claim the foregoing I have hereunto set my hand at London, in the county of Dane and State of Wisconsin.

JOHN G. RIEFF.